United States Patent [19]

Parker

[11] Patent Number: 5,370,160
[45] Date of Patent: Dec. 6, 1994

[54] APPARATUS FOR SERVICING AUTOMATIC TRANSMISSIONS AND THE LIKE

[76] Inventor: Zachary T. Parker, 3 Quail Cir., Phillips Ranch, Calif. 91766

[21] Appl. No.: 145,686

[22] Filed: Oct. 29, 1993

Related U.S. Application Data

[63] Continuation-in-part of Ser. No. 11,992, Feb. 1, 1993, abandoned.

[51] Int. Cl.⁵ .............................................. B65B 3/12
[52] U.S. Cl. .................................... 141/98; 141/65; 141/4; 134/169 C; 134/166 C
[58] Field of Search ............... 141/98, 4, 5, 7, 65, 141/59; 134/169 C, 166 C; 222/573; 184/1.5, 106

[56] References Cited

U.S. PATENT DOCUMENTS

| | | |
|---|---|---|
| 1,829,173 | 10/1931 | Wertz . |
| 1,884,820 | 10/1932 | Osborne . |
| 3,216,527 | 11/1965 | Lewis . |
| 3,447,636 | 6/1969 | Bonfilio . |
| 3,513,941 | 5/1970 | Becnel . |
| 3,720,287 | 3/1973 | Martel ............................ 184/1.5 |
| 3,867,999 | 2/1975 | Cox ................................ 184/1.5 |
| 4,095,672 | 6/1978 | Senese . |
| 4,095,673 | 6/1978 | Takenchi . |
| 4,114,644 | 9/1978 | Piper . |
| 4,128,140 | 12/1978 | Riches ........................... 184/1.5 |
| 4,331,185 | 5/1982 | Rinaldo et al. . |
| 4,674,456 | 6/1987 | Merritt .......................... 184/1.5 |
| 4,745,989 | 5/1988 | DiMatteo . |
| 4,807,674 | 2/1989 | Sweet ............................... 141/59 |
| 4,869,346 | 9/1989 | Nelson ........................... 184/1.5 |
| 4,938,315 | 7/1990 | Ohta et al. ..................... 184/1.5 |
| 4,951,784 | 8/1990 | Bedi . |
| 4,958,666 | 9/1990 | Kocourek et al. . |
| 5,056,621 | 10/1991 | Trevino .......................... 184/1.5 |
| 5,062,398 | 11/1991 | Bedi et al. ..................... 184/1.5 |
| 5,062,500 | 11/1991 | Miller et al. ................... 184/1.5 |
| 5,090,458 | 2/1992 | Creeron ........................... 141/107 |
| 5,092,429 | 3/1992 | Linares et al. ................. 184/1.5 |
| 5,148,785 | 9/1992 | Sendak . |
| 5,318,080 | 6/1994 | Viken . |

FOREIGN PATENT DOCUMENTS 4015354  1/1992  Japan .................................. 184/106

Primary Examiner—Ernest G. Cusick
Attorney, Agent, or Firm—Fulwider, Patton, Lee & Utecht

[57] ABSTRACT

A flusher and refill system for automobile, subassemblies such as an automatic transmission includes a storage tank for waste transmission fluid and a storage tank for unused or replacement transmission fluid. A fluid-conducting hose leading from the subassembly is connected to a fluid flow path leading to the waste fluid storage tank and which includes an electric valve and flow rate monitoring gauge. A second fluid-conducting hose is connected to a pump for pumping fluid from the unused fluid storage tank. The rate at which fluid is pumped out is monitored and a flow control valve in the new fluid flow path is adjusted so that replacement fluid is pumped into the subassembly at the same flow rate as used fluid is being pumped out.

12 Claims, 4 Drawing Sheets

APPARATUS FOR SERVICING AUTOMATIC TRANSMISSIONS AND THE LIKE

This application is a continuation-in-part application Ser. No. 08/011,992 filed Feb. 1, 1993 abandoned.

BACKGROUND OF THE INVENTION

1. Field of the Invention

The subject invention relates to vehicle maintenance and, more particularly, to an apparatus for flushing and filling automatic transmissions with transmission fluid.

2. Description of Related Art

Flushing and filling automatic transmissions with fluid or oil according to prior art methods is a relatively time-consuming and cumbersome process. The conventional method is to change the fluid in the pan of the transmission. The pan typically holds from 1 to 5 quarts of the 7 to 15 quarts of oil which are in the transmission. Hence, this conventional service is ineffective, since it mixes new fluid with a large quantity of used fluid. More recently there have been efforts to change all the fluid by disconnecting the fluid hose and draining the fluid into a waste oil sump while manually pouring new fluid into the transmission dipstick hole. This procedure has proved inadequate and unsafe, and has resulted in damage to transmissions on which it has been used.

SUMMARY OF THE INVENTION

It is therefore an object of the invention to provide apparatus which simplifies and reduces the time involved in flushing and refilling an automatic transmission.

It is another object of the invention to provide apparatus which automatically flushes used transmission fluid and refills the transmission with new fluid with minimal operator intervention.

According to the invention, apparatus is provided which permits used transmission fluid to be withdrawn from the transmission while new or replacement fluid is being simultaneously pumped in. In one embodiment, the automatic transmission's own fluid pump is employed to pump fluid out of the transmission. The flow rate created by that pump is measured and used to set the rate at which a second pump in the apparatus pumps new or replacement fluid into the transmission. By regulating the flow rates into and out of the transmission to be equal, the fluid may be entirely replaced without risk of damage to the transmission.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a compact, convenient transmission flusher apparatus adaptable for use with various vehicles and automatic transmissions.

Figure 1:
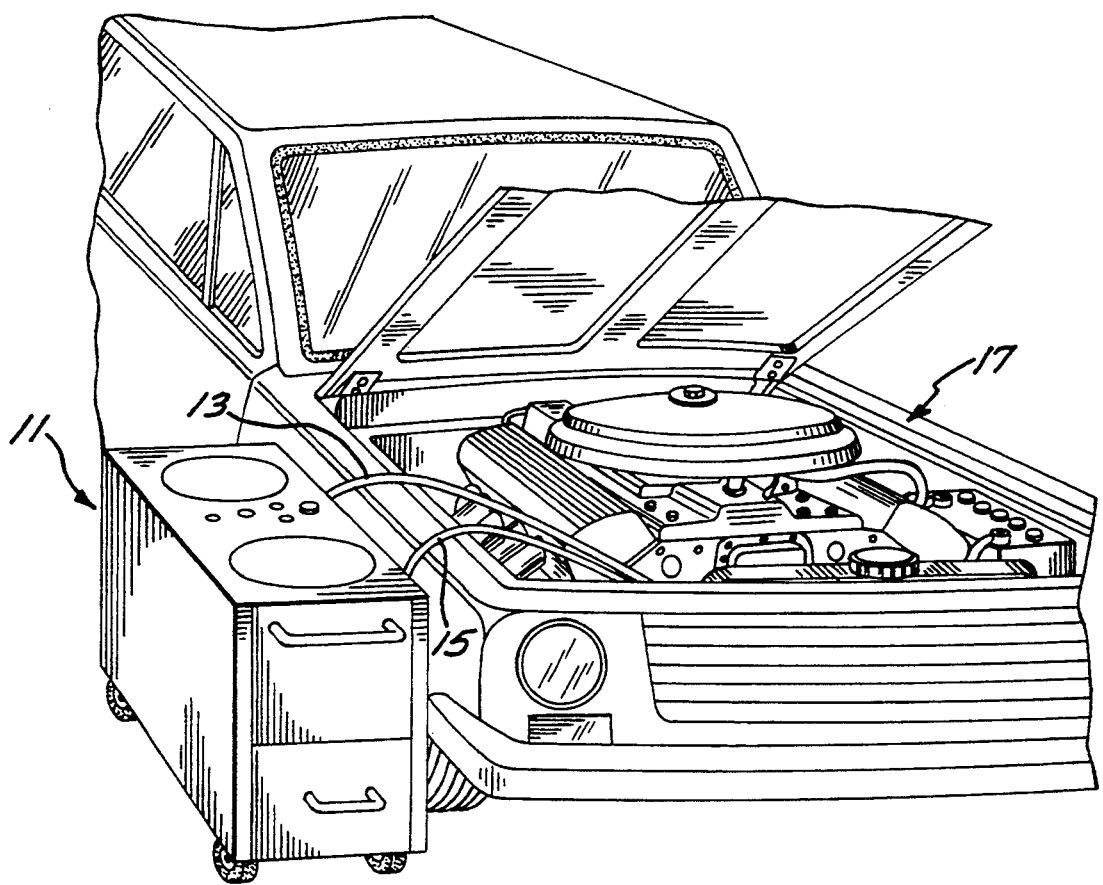
FIG. 1 is a pictorial perspective view illustrating the preferred embodiment in position for flushing a transmission.

As shown in FIG. 1, the automatic transmission flusher apparatus 11 according to the preferred embodiment includes first and second hoses 13 and 15. These hoses 13, 15 are shown entering the engine compartment of an automobile 17.

Figure 2:
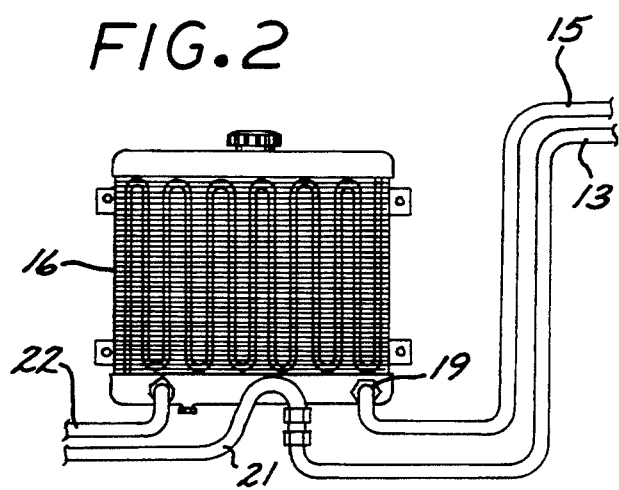
FIG. 2 is an elevational pictorial view illustrating interconnections according to the preferred embodiment.

As is known in the art, cooler lines 21, 22 (FIG. 2) extend between the automatic transmission and the radiator 16 of the typical automobile. Fluid is circulated to and through the radiator 16 and back to the transmission in order to cool the fluid. The automatic transmission and its internal pump and other componentry may be viewed as a subassembly of the automobile.

According to the preferred embodiment, one of these cooler lines 21 is disconnected from the radiator 16. The disconnected cooler line 21 is then connected to hose 13, thereby establishing a path for used transmission oil to flow from the transmission into the flusher apparatus 11. The second hose 15 of apparatus 11 is connected to the cooler port 19 of the radiator 16 where the line 21 from the transmission now connected to hose 13 was previously connected. Other interconnections of hoses 13, 15 in the fluid flow path between the transmission and radiator are, of course, possible consistent with the overall operation described herein. For example, line 13 could be hooked up, at the transmission pump output at which hose 21 is connected.

In overall operation, the engine of automobile 17 is started. When the engine is started, the pump associated with the transmission of automobile 17 activates and begins to pump transmission fluid into hose 13. The flusher apparatus 11 is then activated and begins to simultaneously pump new transmission fluid into the transmission through hose 15, while simultaneously extracting the old transmission fluid through hose 13. This operation will now be described in detail in connection with the detailed drawings of FIGS. 2 and 3.

As noted above, the first hose 13 is connected to the hose 21 which normally conducts fluid between the transmission of the automobile 17 and the radiator. For this purpose, hose 13 is provided with a suitable hose coupling which mates with the hose coupling of hose 21.

Figure 3:
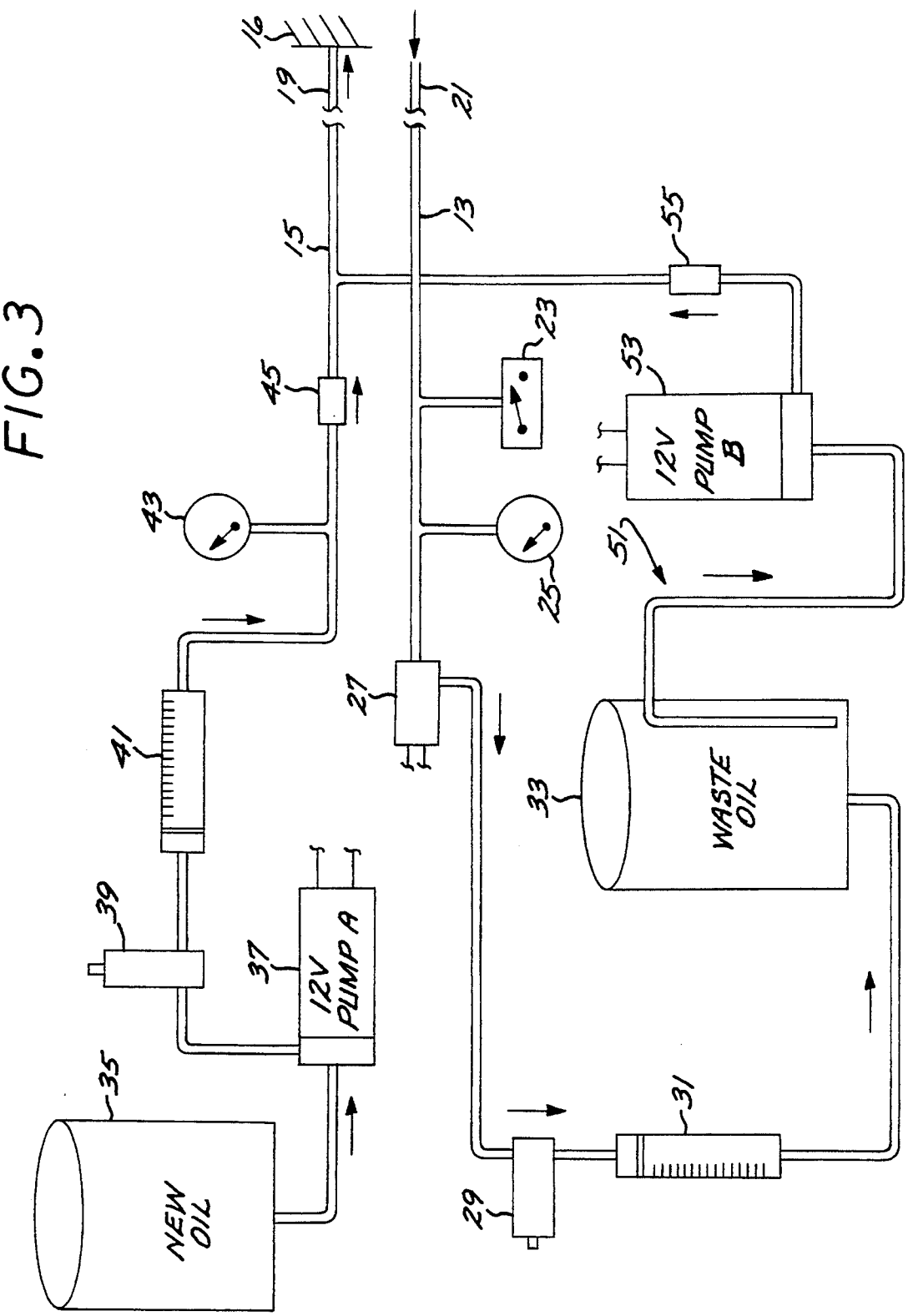
FIG. 3 is a schematic diagram of the preferred embodiment.

As illustrated in FIG. 3, the fluid flow path through hose 13 to a waste storage tank 33 includes pressure-sensing switch 23, a pressure gauge 25, an electric valve 27, a flow control valve 29, and a sight glass flow meter 31, which provides a visible measurement of flow in gallons per minute. The pressure-sensing switch 23 detects fluid flow in hose 13. When the switch 23 detects fluid flow, it enables operation of the flusher apparatus 11, as hereafter described in more detail in conjunction with FIG. 4.

The pressure gauge 25 shows the fluid flow pressure in pounds per square inch in hose 13. The electric valve 27 either opens or closes the fluid flow path through hose 13 to waste storage tank 33. The flow control valve 29 (3000 psi) is manually adjusted to reduce or increase the fluid flow rate. The sight glass 31 allows visual indication of fluid flow through hose 13 in gallons per minute (0–20 gallons per minute).

The fluid flow path for injecting new oil into the transmission through hose 15 includes a fluid holding or storage tank 35 for new (unused) oil, a 12-volt pump 37, a flow control valve 39, a sight glass flow meter 41, a return pressure gauge 43, and a check valve 45. When activated, the pump 37 causes transmission fluid to be pumped from the tank 35 through hose 15, and ultimately into the transmission of the automobile 17. The sight glass 41 and return pressure gauge 43 allow visual indications of the return pressure and return flow through hose 15 in gallons per minute and pressure in pounds per square inch (psi), respectively.

The flow control valve 39 permits the operator of the flusher apparatus to manually adjust the flow rate through hose 15 so that it may match the flow rate at which used transmission fluid is extracted through hose 13. The check valve 45 (5 psi to 100 psi) prevents fluid from coming back down the line.

In overall operation of the apparatus of FIG. 3, the hoses 13 and 15 are appropriately connected. Then the automobile engine is started, resulting in activation of the pump associated with the automobile's automatic transmission. This pump begins to pump used transmission fluid into hose 13. Fluid cannot flow into waste storage tank 33, however, because of operation of the electric valve 27, which closes the fluid flow path from hose 13. The fluid flow path from hose 13 remains closed while the pressure in hose 13 is building. The flow control valve 37 on the new fluid side is also normally off or closed at this time.

The pressure is then read from pressure gauge 25 to give an indication of whether there may be a problem with operation of the transmission pump. This pressure reading may initially be 40 or 50 psi above the actual pump pressure. Various transmissions have various pump pressures, for example, from 5 to 30 psi.

After the pressure is checked via gauge 25, the operator grips the flow control valve 39. Electric valve 27 and the 12-volt pump 37 are then simultaneously activated. Waste transmission fluid then flows from the transmission to the waste storage tank 33. The flow rate to the waste storage tank 33 is read from sight glass 31 and flow control valve 39 is adjusted to achieve the same flow rate. In this manner, old transmission fluid is pumped from the transmission at the same time and at the same rate as new transmission fluid is being injected into the transmission through hose 15. The flow control valve 29 in the used fluid path provides for additional adjustment, for example, in case the pressure or flow rate at which used fluid is being pumped exceeds that at which the transmission can accept new fluid from hose 15.

Once the waste storage tank 33 is filled, it may be drained by a drain path 51, also shown in FIG. 3. Drain path 51 includes a drain pump 53 and check valve 55, which connect to hose 15. When it is desired to drain the waste fluid in tank 33 hose 15 is disconnected from port 19 and connected to a suitable drain or waste oil storage facility, and the drain pump 53 is activated, pumping waste fluid from tank 33 to such a suitable drain or waste oil storage facility.

Figure 4:
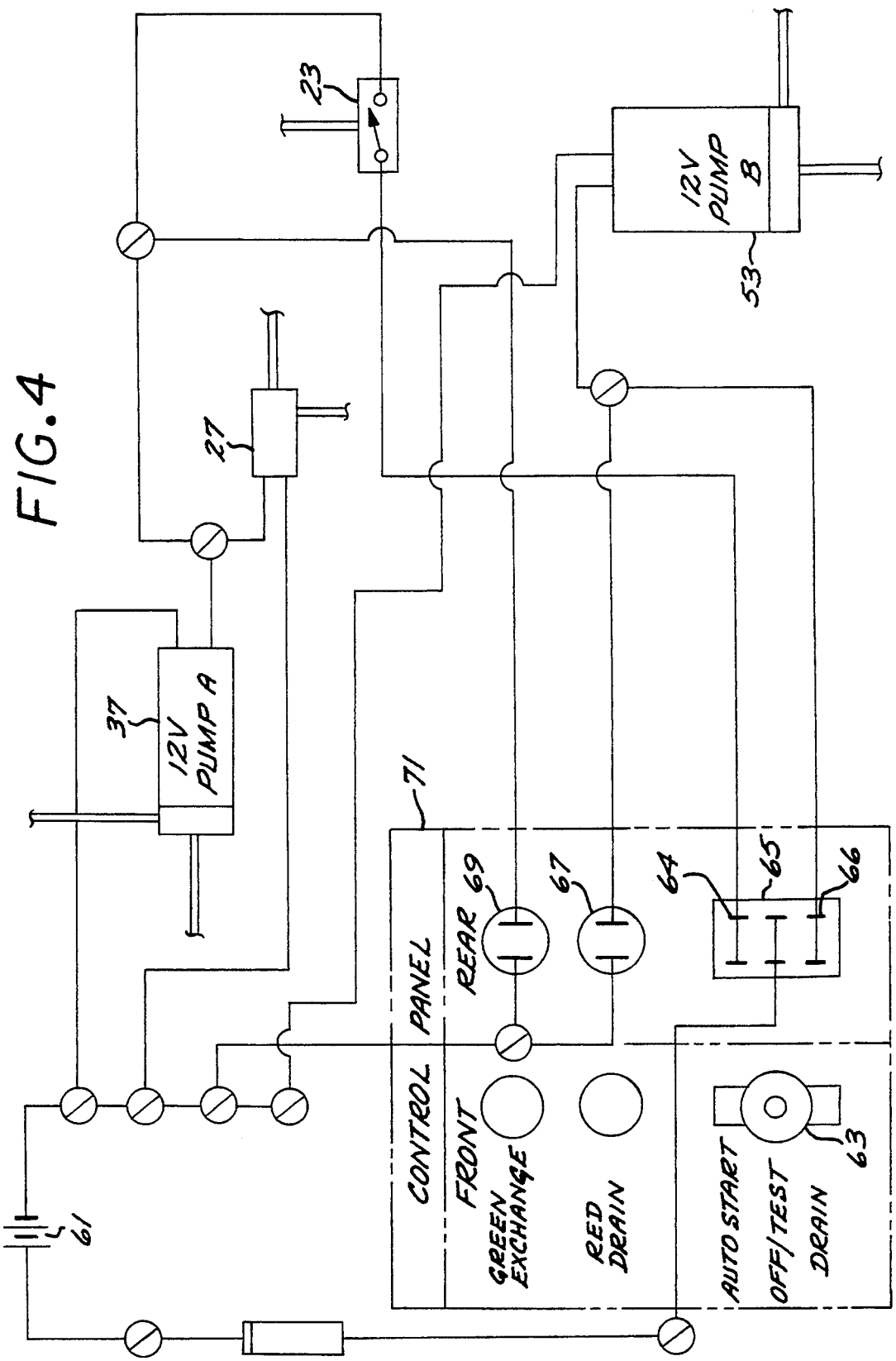
FIG. 4 is an electrical schematic diagram of electrical componentry of the preferred embodiment.

Electrical connections of the apparatus according to the preferred embodiment are shown in FIG. 4. According to FIG. 4, a 12-volt battery 61 is connected to supply positive power to a three-way toggle switch 65 activated by a switch button 63. One pole 64 of the switch 65 is connected to a first terminal of the pressure-sensing switch 23. The pressure-sensing switch 23 has a second terminal connected in common to a first terminal of a 12-volt lamp 69 and to a first terminal of the electric valve 27. The second terminal of the electric valve 27 is grounded, as is the second terminal of the 12-volt indicator lamp 69. The 12-volt power connected to the electrical valve 27 is also connected to a first terminal of the 12-volt pump 37, which has a second terminal connected to ground. Thus, when the switch 63 is placed in the AUTO START position after pressure equalization has been obtained, and assuming that the pressure-sensing switch has detected fluid pressure in hose 13, electric power is simultaneously applied to the electric valve 27, causing it to open and to the 12-volt pump 37, causing it to be activated to pump new transmission fluid through hose 15 and, ultimately, into the transmission of automobile 17.

If the switch button 63 is moved to the DRAIN position, 12-volt power is supplied to the second pole 66 of the three-way switch 65 and, accordingly, to the 12-volt pump 53 and the 12-volt indicator lamp 67. In this position, pump 53 empties the contents of waste storage tank 33 into a suitable waste storage or disposal facility.

As illustrated in FIG. 1, the apparatus shown in FIGS. 3 and 4 may be conveniently mounted in a portable, wheeled housing, which may be conveniently moved to and from various positions of use and storage. The 12-volt battery 61 of FIG. 4 is preferably the vehicle battery electrically interconnected to the electrical circuitry of FIG. 4 by jumper cables leading into the wheeled housing. In this manner, the portability of the unit is enhanced, being independent of electrical outlets or other power interconnections, which may be unavailable.

Figure 5:
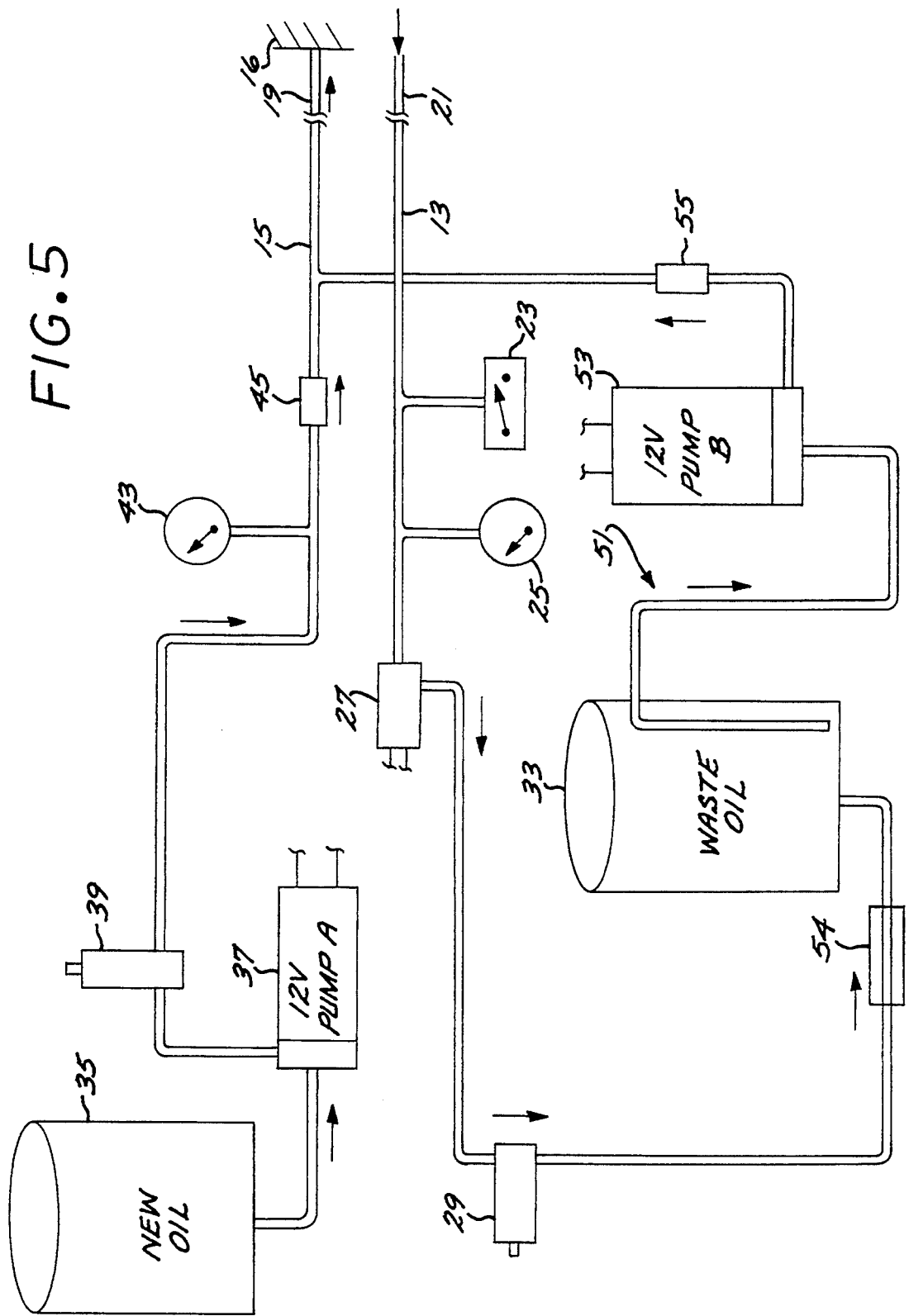
FIG. 5 is a schematic diagram of an alternate embodiment.

FIG. 5 illustrates an alternate embodiment, which omits the sight glasses 31, 41 of FIG. 3. This embodiment operates like that of FIG. 3 in all respects except that omission of the sight glasses is compensated for by visually monitoring the level of the fluid in the dipstick hole and assuring that valves 29 and 39 are adjusted to a flow rate which maintains the fluid level constant, preferably at the "full" mark typically present. Such a check may be made by simply looking into the hole or by monitoring a "wand" or measuring device which extends out of the hole. Such a visual check is also useful and preferably employed during operation of the embodiment of FIG. 3 to assure precise flow rate adjustment. The embodiment of FIG. 5 further includes a sight glass 54. As fluid is replaced, one observes the fluid color through sight glass 54. When the color changes from brown to red, the old fluid has been completely replaced and the service is done.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. Method for replacing fluid in an automatic transmission wherein said fluid is circulated through a remote cooler via conduits, comprising the steps of:
   intercepting one of said conduits to interconnect the upstream side with a used fluid receptacle, and the downstream side with a source of fresh fluid;
   causing the transmission pump to expel fluid into said receptacle at a controlled flow rate; and
   causing an external pump to force fresh fluid from said source into said transmission via the downstream side of the intercepted conduit at a flow rate matched to the rate at which fluid is being expelled into said receptacle.

2. The method of claim 1 wherein the flow rate of fresh fluid being pumped into said transmission is matched to the flow rate of used fluid being expelled from the transmission by monitoring gauges measuring the respective flow rates and adjusting a flow control valve disposed between the source of fresh fluid and the downstream side of the intercepted conduit so as to effect a matched reading.

3. The method of claim 2 further comprising the step of adjusting a flow control valve disposed between the upstream side of the intercepted conduit, and the used fluid receptacle to limit the flow rate of used fluid being expelled therefrom to a rate at which fresh fluid can be pumped into said transmission.

4. The method of claim 1 further comprising the step of adjusting a flow control valve disposed between the upstream side of the intercepted conduit, and the used fluid receptacle to limit the flow rate of used fluid being expelled therefrom to a rate at which fresh fluid can be pumped into said transmission.

5. Apparatus for replacing fluid in an automatic transmission wherein said fluid is circulated through a remote cooler via conduits, comprising:
   a receptacle for used fluid;
   a source of fresh fluid;
   a drain line for conducting used fluid issuing from the upstream side of one of said conduits to said receptacle;
   a flow control valve for regulating the flow rate of used fluid from the transmission through said drain line;
   a feed line for conducting fresh fluid from said source to the downstream side of said conduit;
   a pump disposed between said source and the downstream side of said conduit for forcing fresh fluid through said feed line into the transmission; and
   a flow control valve for regulating the flow rate of fresh fluid through said feed line into the transmission so as to match the flow rate of used fluid issuing from the transmission.

6. The apparatus of claim 5 further comprising a flow meter for measuring the flow rate of the used fluid from the upstream side of said conduit, and a flow meter for measuring the flow rate of the fresh fluid being forced into the downstream side of said conduit.

7. The apparatus of claim 5 wherein said pump is electrically powered.

8. The apparatus of claim 7 further comprising an electric cut-off valve for controlling the flow of used fluid through the drain line wherein the flow path is opened upon activation.

9. The apparatus of claim 8 wherein said pump and valve are powered by a 12V power source.

10. The apparatus of claim 8 further comprising a pressure switch for simultaneously activating the electric pump and electric valve upon sensing a predetermined pressure in the drain line.

11. Apparatus for replacing fluid in an automatic transmission wherein said fluid is circulated through conduits, and comprising:
    a receptacle for used fluid;
    a container of fresh fluid;
    a drain line for conducting used fluid issuing from the upstream side of one of said conduits to said receptacle;
    a flow control valve for regulating the flow rate of used fluid from the transmission through said drain line;
    a feed line for conducting fresh fluid from said container to the downstream side of said conduit; and
    a pump disposed between said container and the downstream side of said conduit for forcing fresh fluid through said feed line into the transmission.

12. Apparatus for replacing fluid in an automatic transmission wherein said fluid is circulated through conduits, and comprising:
    a receptacle for used fluid;
    a container of fresh fluid;
    a drain line for conducting used fluid issuing from the upstream side of one of said conduits to said receptacle;
    a feed line for conducting fresh fluid from said source to the downstream side of said conduit;
    a pump disposed between said source and the downstream side of said conduit for forcing fresh fluid through said feed line into the transmission; and
    a flow control valve for regulating the flow rate of fresh fluid through said feed line into the transmission.

* * * * *

(12) REEXAMINATION CERTIFICATE (4613th)

United States Patent
Parker

(10) Number: US 5,370,160 C1
(45) Certificate Issued: Jul. 16, 2002

(54) APPARATUS FOR SERVICING AUTOMATIC TRANSMISSONS AND THE LIKE

(75) Inventor: Zachary T. Parker, Phillips Ranch, CA (US)

(73) Assignee: Flo-Dynamics, LLC, Compton, CA (US)

Reexamination Request:
No. 90/005,683, Mar. 21, 2000

Reexamination Certificate for:
Patent No.: 5,370,160
Issued: Dec. 6, 1994
Appl. No.: 08/145,686
Filed: Oct. 29, 1993

Related U.S. Application Data

(63) Continuation-in-part of application No. 08/011,992, filed on Feb. 1, 1993, now abandoned.

(51) Int. Cl.$^7$ .................................................. B65B 3/12
(52) U.S. Cl. ............................ 141/98; 141/65; 141/4; 134/169 C; 134/166 C; 184/1.5
(58) Field of Search ............................ 141/98, 4, 5, 7, 141/65, 59; 134/169 C, 166 C; 222/573; 184/1.5, 106

(56) References Cited

U.S. PATENT DOCUMENTS 2,499,705 A 3/1950 Vokes
5,289,837 A 3/1994 Betancourt
5,318,080 A 6/1994 Viken
5,390,762 A 2/1995 Nelson

FOREIGN PATENT DOCUMENTS

JP 6179099 5/1986
JP 2-72299 3/1990

OTHER PUBLICATIONS

Yamada AFC–6000 Automatic Fluid Changer Manual for Model No. 880666, Nov. 1991.
Advertisement from Automobile Buying Guide, Oct. 1990 and translation.
Ad from Taiwan Automobile Repair Industry Association Journal and translation, 1991.

Primary Examiner—Steven O. Douglas

(57) ABSTRACT

A flusher and refill system for automobile, subassemblies such as an automatic transmission includes a storage tank for waste transmission fluid and a storage tank for unused or replacement transmission fluid. A fluid-conducting hose leading from the subassembly is connected to a fluid flow path leading to the waste fluid storage tank and which includes an electric valve and flow rate monitoring gauge. A second fluid-conducting hose is connected to a pump for pumping fluid from the unused fluid storage tank. The rate at which fluid is pumped out is monitored and a flow control valve in the new fluid flow path is adjusted so that replacement fluid is pumped into the subassembly at the same flow rate as used fluid is being pumped out.

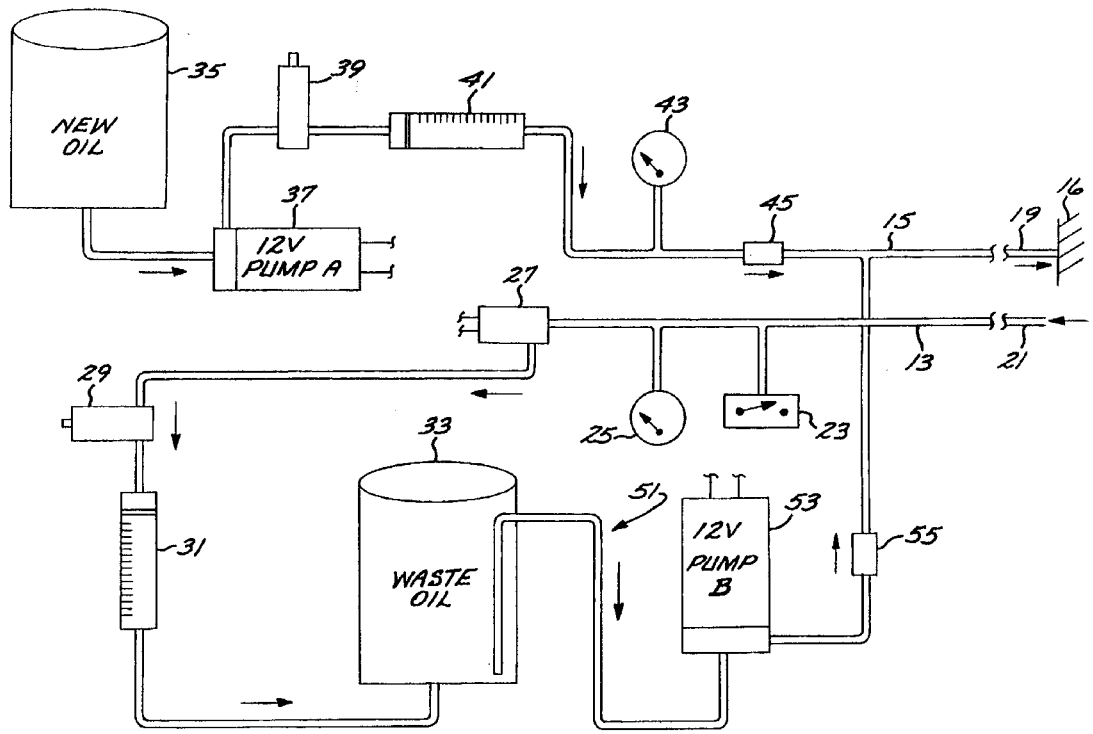

US 5,370,160 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 is confirmed.

Claims 11 and 12 are determined to be patentable as amended.

New claims 13–29 are added and determined to be patentable.

11. Apparatus for replacing fluid in an automatic transmission wherein said fluid is circulated through conduits, and comprising:
 a receptacle for used fluid;
 a container of fresh fluid;
 a drain line for conducting used fluid issuing from the upstream side of one of said conduits to said receptacle;
 [a flow control valve for regulating the flow rate of used fluid from the transmission through said drain line;]
 a feed line for conducting fresh fluid from said container to the downstream side of said conduit; [and]
 a pump disposed between said container and the downstream side of said conduit for forcing fresh fluid through said feed line into the transmission[.] *at a predetermined rate; and*
 *a control valve selectively operable to incrementally set positions for regulating the flow rate of used fluid from the transmission through said drain line to substantially match said predetermined rate.*

12. Apparatus for replacing fluid in an automatic transmission wherein said fluid is circulated through conduits, and comprising:
 a receptacle for used fluid;
 a container of fresh fluid;
 a drain line for conducting used fluid issuing from the upstream side of one of said conduits to said receptacle;
 a feed line for conducting fresh fluid from said source to the downstream side of said conduit;
 a pump disposed between said source and the downstream side of said conduit for forcing fresh fluid through said feed line into the transmission; and
 a flow control valve for regulating the flow rate of fresh fluid through said feed line [into the transmission] *to match such flow rate with the flow rate in said drain line*.

*13. Apparatus for replacing fluid as set forth in claim 11 wherein:*
 *said control valve is manually adjustable.*

*14. Apparatus for replacing fluid as set forth in claim 11 wherein:*
 *said control valve is maintained in an open state during said flow regulation.*

*15. Method for replacing used transmission fluid circulated between a transmission having a pump and a remote cooler via conduits comprising the steps of:*
 *disconnecting one of said conduits to create a free upstream end and an exposed downstream port;*
 *connecting said free upstream end with a drain line for conducting used fluid issuing from the upstream side of said conduit to a drain receptacle;*
 *connecting a feed line with said exposed downstream port for conducting fresh fluid into the transmission from a fresh fluid source;*
 *causing the transmission pump to expel fluid at a first flow rate through said drain line into said receptacle;*
 *manually regulating a flow control valve to adjust said first flow rate to a controlled used fluid flow rate;*
 *causing an external pump to force fresh fluid at a second flow rate from said source into said transmission via the downstream side of the intercepted conduit; and*
 *manually regulating a flow control valve disposed between said source and said transmission to adjust said second flow rate to match said controlled used fluid flow rate.*

*16. Method for replacing fluid in an automatic transmission wherein the fluid is circulated through conduits connecting a remote cooler to the transmission, comprising the steps of:*
 *removing one of the conduits from a remote cooler port and connecting the upstream side of the conduit to one end of a drain line having its opposing end disposed within a drain receptacle and further connecting the remote cooler port to one end of a supply line having its opposing end in fluid communication with a source of fresh fluid;*
 *causing the transmission to expel used fluid at a first flow rate through said drain line into said receptacle;*
 *adjusting a first flow control valve in fluid communication with said drain line to regulate said first flow rate of used transmission fluid issuing through said drain line to a predetermined flow rate;*
 *causing a supply pump in fluid communication with said supply line to conduct fresh fluid from said source into said remote cooler port at a second flow rate as said used fluid is expelled; and*
 *adjusting a second flow control valve in fluid communication with said supply line to regulate said second flow rate to substantially match said predetermined flow rate.*

*17. Method for replacing fluid as set forth in claim 16 further including thestep of:*
 *manually adjusting said first and second flow control valves to substantially match said second flow rate to said predetermined flow rate.*

*18. Method for replacing fluid as set forth in claim 16 further including the steps of:*
 *providing a first visual indicator connected to said drain line for producing an indication corresponding to the flow rate of used oil issuing through said drain line;*
 *providing a second visual indicator connected to said supply line for producing an indication corresponding to the flow rate of fresh oil conducted through said supply line; and*
 *adjusting each of said flow control valves acording to their respective indications so as to effect said matched flow rate.*

*19. Method for replacing fluid as set forth in claim 18 wherein:*
 *each of said visual indicators is in the form of a demarcated sight glass.*

20. Method for replacing fluid as set forth in claim 19 further including the step of:

monitoring used fluid pressure in said drain line with a pressure sensing switch responsive to a predetermined pressure to, upon sensing said predetermined pressure, open an electric valve in fluid communication with said drain line to open a flow path.

21. Method of replacing fluid as set forth in claim 20 further including the steps of:

selecting an electric supply pump for conducting fresh fluid from said source to said remote cooler port; and supplying power to said electric supply pump and said electric valve with a 12V vehicle battery.

22. Method of replacing fluid as set forth in claim 16 further including the step of:

opening said control valves and maintaining said control valves open while adjusting said valves incrementally to effect said matched flow rate.

*23. Method for replacing fluid in an automatic transmission wherein the fluid is circulated between a tansmission and a remote cooler via conduits, comprising the steps of:*

*intercepting a conduit communicating with the remote cooler to expose a free end of said conduit and a remote cooler port;*

*configuring said free end in fluid communication with a used fluid receptacle;*

*configuring said remote cooler port in fluid communication with a source of fresh fluid;*

*causing a transmission pump to expel fluid into said receptable at a controlled flow rate;*

*monitoring a first display connected to said drain line for measuring said controlled flow rate;*

*actuating an external pump to force fresh fluid from said source into the transmission via the downstream side of the intercepted conduit at a predetermined flow rate as said transmission pump expels fluid into said receptacle;*

*monitoring a second display connected to said supply line for measuring said predetermined flow rate; and*

*adjusting a flow control valve disposed between the source of fresh fluid and the remote cooler so as to cause said predetermined flow rate to substantially match said controlled flow rate.*

*24. Method for exchanging fluid in an automatic transmission wherein the fluid is circulated between a transmission having a pump and a remote cooler via conduits, comprising the steps of:*

*disconnecting a conduit from the remote cooler to create an open cooler port;*

*placing the free end of the conduit in fluid communication with a drain line partially disposed in a used fluid receptacle;*

*attaching a supply line to said open cooler port and disposing its opposing end in a source of fresh fluid;*

*providing an external pump in fluid communication with said supply line to draw fresh fluid from said source to said cooler port;*

*causing the transmission pump to expel used fluid at a controlled rate through said drain line;*

*activating said external pump to draw fresh fluid from said source and supply said fresh fluid into said cooler port;*

*monitoring the flow rate of said used fluid and said fresh fluid;*

*manually adjusting at least one flow control valve in fluid communication with one of said lines so as to match said flow rates; and*

*monitoring a visual indicator connected to said drain line and said supply line to determined completion of the fluid exchange.*

*25. Apparatus for replacing fluid in an automatic transmission wherein said fluid is circulated through a remote cooler via conduits, comprising:*

*a receptacle for used fluid;*

*a source of fresh fluid;*

*a drain line for conducting used fluid issuing from the upstream side of one of said conduits to said receptacle;*

*a first monitor connected to said drain line for displaying the flow rate of said used fluid through said drain line;*

*a feed line for conducting fresh fluid from said source to the downstream side of said conduit;*

*a second monitor connected to said feed line for displaying the flow rate of fresh fluid through said feed line;*

*a pump disposed between said source and the downstream side of said conduit for conducting fresh fluid through said feed line into the transmission; and*

*at least one flow control valve disposed in one of said lines to manually regulate the rate of flow in the respective line to match the flow rate in the other of said lines.*

*26. Apparatus for replacing fluid in an automatic transmission wherein said fluid is circulated by the transmission pump to a remote cooler through conduits adapted to be disconnected and comprising:*

*a receptacle for used fluid;*

*a container of fresh fluid;*

*a drain line constructed to connect at one end to one of the conduits having been disconnected and at the opposing end disposed within said receptacle and including a flow control valve constructed to regulate the flow rate of used fluid issuing from the transmission through the drain line;*

*a feed line constructed to connect at one end to the opposite end of said disconnected conduit and having its opposing end disposed within said container;*

*a supply pump disposed between said transmission and said container operable to supply fresh fluid into the transmission; and*

*a flow control valve constructed to adjust the flow rate of fluid conducted from said container to said transmission at a flow rate substantially equal to the flow rate of used fluid.*

*27. Apparatus for replacing fluid as set forth in claim 26 further including:*

*a first sight glass connected to said drain line for measuring and displaying the flow rate of the used fluid; and*

*a second sight glass connected to said supply line for measuring and displaying the flow rate of the fresh fluid.*

*28. Apparatus for replacing fluid in an automatic transmission having a pump for circulating said fluid through conduits between the transmission and a remote cooler unit comprising:*

*a used flow circuit including a drain line connected at one end to a disconnected conduit and having its opposing end disposed within a used oil storage receptacle, said used flow circuit further including first visual indicator* connected to said drain line for displaying an indication of the flow rate of used fluid issuing from the transmission by the transmission pump through said drain line and a first flow control valve for manually adjusting the used oil flow rate;

a supply fluid flow circuit including a supply line connected at one end to a disconnected remote cooler port and having its opposing end disposed within a fresh oil source, said supply circuit further including a supply pump for conducting fluid from said source into said remote cooler port, a second visual indicator connected to said supply line for displaying an indication of the flow rate of fresh fluid, and a second flow control valve for manually adjusting the flow rate of fresh fluid; and wherein said transmission may be activated to cause the transmission pump to expel fluid through said drain line and said supply pump may be activated to conduct fresh fluid to the transmission while first and second visual indicators are compared and said first and second control valves are adjusted so as to effect a matched flow rate between used fluid and fresh fluid.

29. Apparatus for replacing fluid in claim 28 wherein:

each of said visual indicators is a demarcated sight glass.

\* \* \* \* \*